US011869474B2

(12) United States Patent
Simla et al.

(10) Patent No.: US 11,869,474 B2
(45) Date of Patent: Jan. 9, 2024

(54) SOUND ABSORBING LIGHT FIXTURE

(71) Applicant: LUMENWERX ULC, Saint-Laurent (CA)

(72) Inventors: Michael Evan Simla, Lachine (CA); Timothy Ernest Gulsrud, Longmont, CO (US)

(73) Assignee: LUMENWERX ULC.

(*) Notice: Subject to any disclaimer, the term of this patent is extended or adjusted under 35 U.S.C. 154(b) by 0 days.

(21) Appl. No.: 17/172,751

(22) Filed: Feb. 10, 2021

(65) Prior Publication Data

US 2021/0248988 A1 Aug. 12, 2021

Related U.S. Application Data

(60) Provisional application No. 62/972,260, filed on Feb. 10, 2020.

(51) Int. Cl.
*G10K 11/172* (2006.01)
*F21S 8/04* (2006.01)
*G10K 11/162* (2006.01)
*F21Y 115/10* (2016.01)

(52) U.S. Cl.
CPC ............ *G10K 11/172* (2013.01); *F21S 8/043* (2013.01); *G10K 11/162* (2013.01); *F21Y 2115/10* (2016.08)

(58) Field of Classification Search
CPC ..... G10K 11/172; G10K 11/162; F21S 8/043; F21S 4/28; F21S 8/061; F21Y 2115/10
See application file for complete search history.

(56) References Cited

U.S. PATENT DOCUMENTS

| | | | | |
|---|---|---|---|---|
| 6,617,002 | B2 * | 9/2003 | Wood | G10K 11/16 428/137 |
| 8,287,146 | B2 * | 10/2012 | Hysky | E04B 9/366 362/147 |
| 10,359,163 | B1 * | 7/2019 | Hettwer | F21S 4/28 |
| 10,672,376 | B1 * | 6/2020 | Pickens | F21V 33/006 |
| 10,746,917 | B2 | 8/2020 | Ross et al. | |
| 10,876,290 | B2 * | 12/2020 | Patterson | F21V 21/008 |
| 10,935,217 | B1 * | 3/2021 | Carahalios | F21V 23/023 |
| 10,961,700 | B2 * | 3/2021 | Udagawa | F21S 8/06 |
| D917,079 | S * | 4/2021 | Patterson | D25/138 |
| 2013/0148357 | A1 * | 6/2013 | Johnston | F21V 33/006 362/253 |
| 2016/0372100 | A1 * | 12/2016 | Mason | G10K 11/172 |
| 2018/0245334 | A1 * | 8/2018 | Udagawa | E04B 1/84 |
| 2018/0334804 | A1 * | 11/2018 | Patterson | F21S 2/005 |
| 2019/0088241 | A1 * | 3/2019 | Czech | F21S 8/043 |

* cited by examiner

*Primary Examiner* — Tsion Tumebo
(74) *Attorney, Agent, or Firm* — BACON&THOMAS, PLLC

(57) ABSTRACT

A sound absorbing light fixture comprising at least one light emitting element comprising light emitting diodes (LEDs) extending along a first side with at least one perforated panel comprising perforations selected to create an acoustic resonance condition within a cavity of the light fixture comprising a sound absorbing core. The perforated panels are additionally configured to conceal at least a portion or an entirety of the sound absorbing core.

19 Claims, 8 Drawing Sheets

SOUND ABSORBING LIGHT FIXTURE

CROSS-REFERENCE TO RELATED APPLICATIONS

The present patent application claims the benefits of priority of U.S. Patent Application No. 62/972,260, entitled "SOUND ABSORBING LIGHT FIXTURE", and filed at the United States Patent Office on Feb. 10, 2020, the content of which is incorporated herein by reference.

FIELD OF THE INVENTION

The present invention generally relates to light fixtures and, in particular, sound absorbing light fixtures for mitigating excess ambient noise.

BACKGROUND OF THE INVENTION

Recent architectural trends have increasingly promoted the use of open-plan floor designs making use of large, open spaces while minimizing the use of small, enclosed rooms such as private offices. Open-plan designs are generally promoted as improving collaboration amongst individuals while reducing the square footage necessary for each employee.

Nevertheless, research has increasingly shown the negative impact of open-plan workplaces with many citing high noise levels as a primary factor. Noise levels are particularly problematic in open-plan spaces incorporating hard surfaces as these cause reverberations of all sound sources and therefore generate a loud environment. Occupants of open-plan spaces are therefore subjected to hearing sounds directly from the sound source as well as the sound's reflections. The increased excess noise level in open-plan spaces is often deemed distracting and may reduce productivity relative to a quiet environment.

Recent open-plan workplaces have therefore resorted to sound-absorbing or sound-redirecting techniques and materials in an attempt to minimize noise levels. While sound-redirection aims to redirect a sound away from occupants, sound-absorption incorporates materials configured to reduce sound energy via porous absorption. In particular and of relevance to the present invention, sound absorbing light fixtures have been implemented as a discrete and functional method of absorbing sound.

Materials having high sound-absorption properties are not however suitable for use on light fixture as they commonly comprise woven materials which cannot be easily cleaned, and which are aesthetically displeasing. Alternatively, encasing these materials within traditional light fixtures greatly reduces their effectiveness.

Therefore, the most cost-effective and acoustically efficient method of integrating sound absorbing material into high-performance luminaires has been to wrap the light fixture in materials having lesser sound-absorption properties but which are suitable to be exposed. Alternative designs have similarly added additional sound-absorbing panels to the light fixture which additionally serve a light-directing panels.

For example, U.S. Pat. No. 10,746,917 discloses a suspended pendant luminaire which integrates acoustic panels within its structure. These acoustic panels may be made of foam, cork, felt or other sound absorbing materials suitable to be used as a shade for directing light and therefore on an outer portion of the pendant.

United States Patent Publication No. 2019/0088241 discloses an acoustic baffle light fixture comprising a plurality of acoustic sound absorbing panels forming part of the structure. Notably, the sound absorbing panels form part of the external structure of the light fixture and are fabricated from partially recycled PET.

These aforementioned designs illustrate the ways in which the addition of sound absorbing materials increases the size of the luminaire while limiting the material selection and creative flexibility of designers. Moreover, the external use of the sound-absorbing materials do not offer the best sound-absorption properties.

There is therefore the need for an effective means of incorporating sound-absorbing materials in a light fixture while allowing design flexibility without compromising the sound-absorption properties of the selected materials.

SUMMARY OF THE INVENTION

The shortcomings of the prior art are generally mitigated by a sound absorbing light fixture comprising a frame, a light emitting element extending along at least a first side of the frame, at least one perforated panel affixed to the frame comprising a plurality of perforations, and at least one sound absorbing core, wherein the frame, light emitting element and the at least one perforated panel define a cavity within the sound absorbing light fixture configured to receive the at least one sound absorbing core, and wherein the at least one perforated panel is configured to conceal at least a portion of the at least one sound absorbing core.

The sound absorbing core may comprise one or more sound absorbing panels made of sound absorbing material and an air gap, selected such as to provide the desired acoustic performance with the sound absorbing material potentially comprising synthetic woven fibers. Moreover, the air gap may represent approximately 25% to 50% of a total volume of the cavity.

A cross-sectional shape and a depth of the perforations may be selected such as to create an acoustical resonance condition within the cavity. Accordingly, the cross-sectional shape and the depth of the perforations may be selected using the following equation:

$$Fv = \frac{CD}{4}\sqrt{\frac{1}{\pi V(L+0.75D)}}$$

wherein Fv is the preferred resonant frequency of operation, V is the volume of the cavity, D is the diameter of one of the perforations, L is the depth of one of the perforations and C is the speed of sound.

A total surface area of the perforations may represent between 30% to 60% of a total surface area of the at least one perforated panel and a shape of said perforations may be selected from one or more of: round, square, oval and rectangle. Similarly, a cross-sectional surface area of each of the perforations is less than 176 $mm^2$.

A second light emitting element may extend along a second side of the sound absorbing light fixture and said light emitting elements may comprise light-emitting diodes. The at least one perforated panel may comprise a rigid or semi-rigid material and a concealing layer may be configured to conceal at least a portion of the at least one sound absorbing core.

In another aspect of the invention, a method of mitigating ambient noise is presented. The method comprises placing a sound absorbing core within a cavity of a light fixture, at least partially concealing the sound absorbing core with at least one panel, creating an acoustical resonance condition within the cavity by perforating the at least one panel.

The method may further comprise suspending the light fixture and selecting a cross-sectional shape and a depth of the perforations using the following equation:

$$Fv = \frac{CD}{4}\sqrt{\frac{1}{\pi V(L + 0.75D)}}$$

wherein Fv is the preferred resonant frequency of operation, V is the volume of the cavity, D is the diameter of one of the perforations, L is the depth of one of the perforations and C is the speed of sound.

The method may additionally comprise at least partially concealing the sound absorbing core with a concealing layer. Perforating the at least one panel further may comprise creating perforations representing between 30% to 60% of the total surface area of the at least one perforated panel and/or creating perforations having a cross-sectional surface area of less than 176 $mm^2$.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel sound absorbing light fixture will be described hereinafter. Although the invention is described in terms of specific illustrative embodiments, it is to be understood that the embodiments described herein are by way of example only and that the scope of the invention is not intended to be limited thereby.

Figure 1:
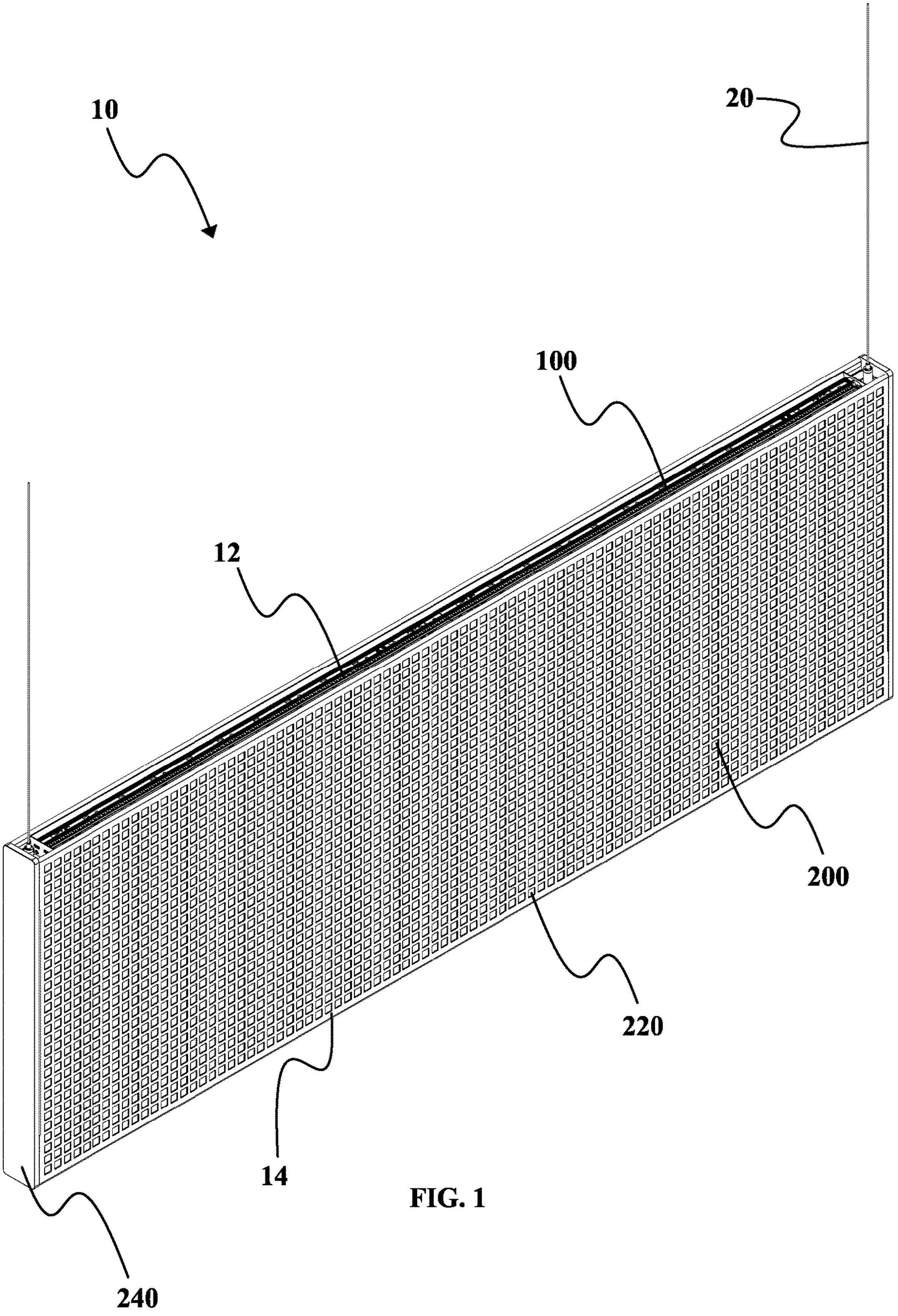
FIG. 1 is an isometric perspective view of an exemplary sound absorbing light fixture in accordance with the principles of the present invention.
Figure 2:
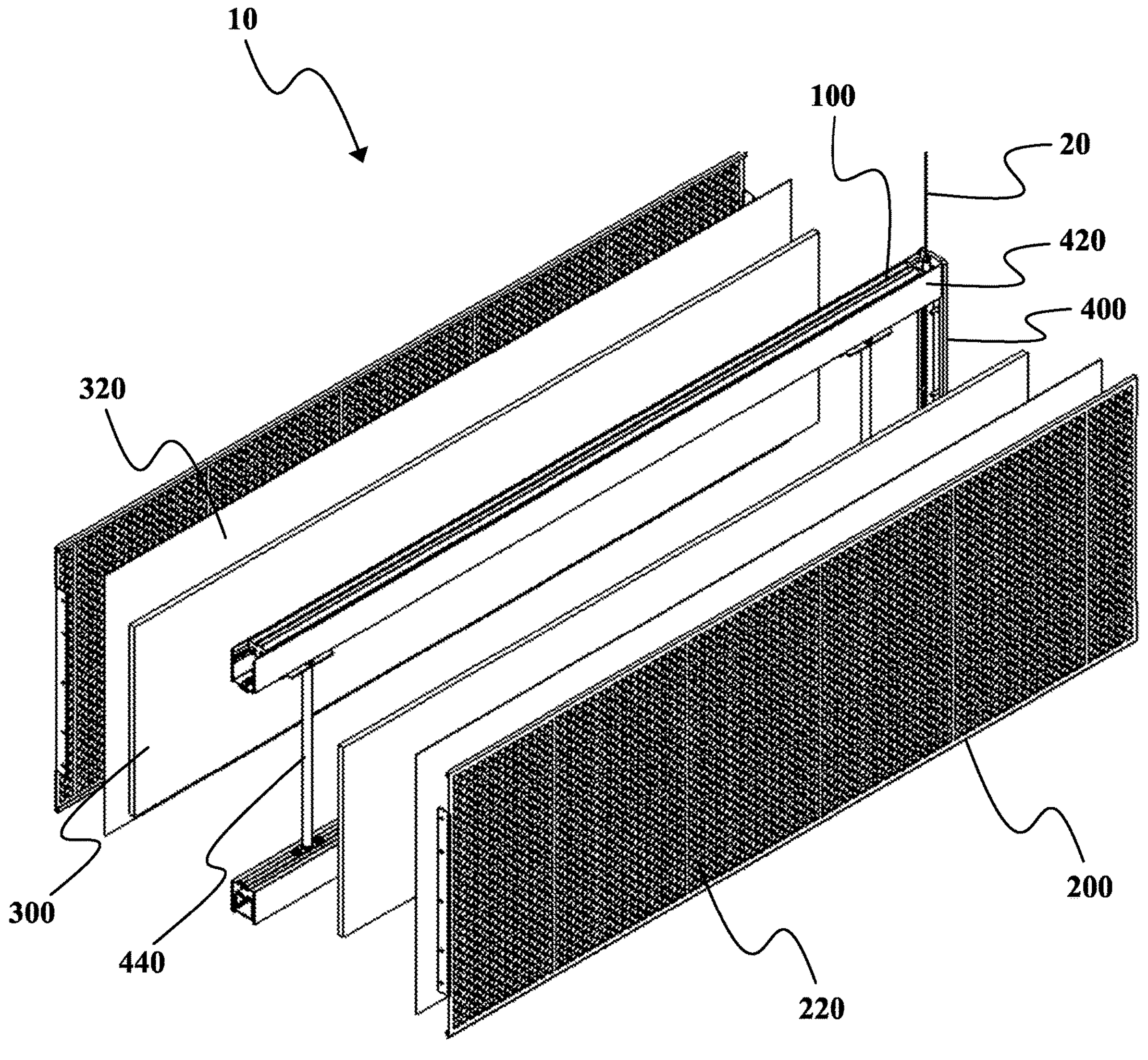
FIG. 2 is an exploded isometric perspective view of the sound absorbing light fixture of FIG. 1.

Referring to FIGS. 1 and 2, an embodiment of a sound absorbing light fixture 10 is illustrated. Broadly speaking, the sound absorbing light fixture 10 is configured to illuminate a space while additionally capturing sound energy reducing sound levels via porous and resonant sound absorption.

The sound absorbing light fixture 10 may be configured to absorb sound energy originating from any source including, but not limited to, the occupants of a space, HVAC systems, general equipment noises or noises originating from outside the space.

The sound absorbing light fixture 10 typically comprises one or more light emitting elements 100, one or more perforated panels 200, one or more sound absorbing panels 300 and a frame 400. It is the one or more perforated panels 200 and one or more sound absorbing panels 300 which will primarily define the sound absorbing properties of the sound absorbing light fixture 10.

In certain embodiments, the sound absorbing light fixture 10 may be configured to suspend from a ceiling or another structure. The sound absorbing light fixture 10 may therefore be suspended by one or more suspension cables 20 configured to support the weight the sound absorbing light fixture 10. In certain embodiments, one or more of the suspension cables 20 may incorporate an electrical cable such as to provide suitable current to the sound absorbing light fixture 10. The suspension cables 20 may be affixed to the frame 400 or any other suitable element of the sound absorbing light fixture 10. In other embodiments however, the sound absorbing light fixture 10 may be a floor-standing lamp, a table lamp, may be supported by any other desirable structure or may be affixed directly to a ceiling or wall.

Figure 3:
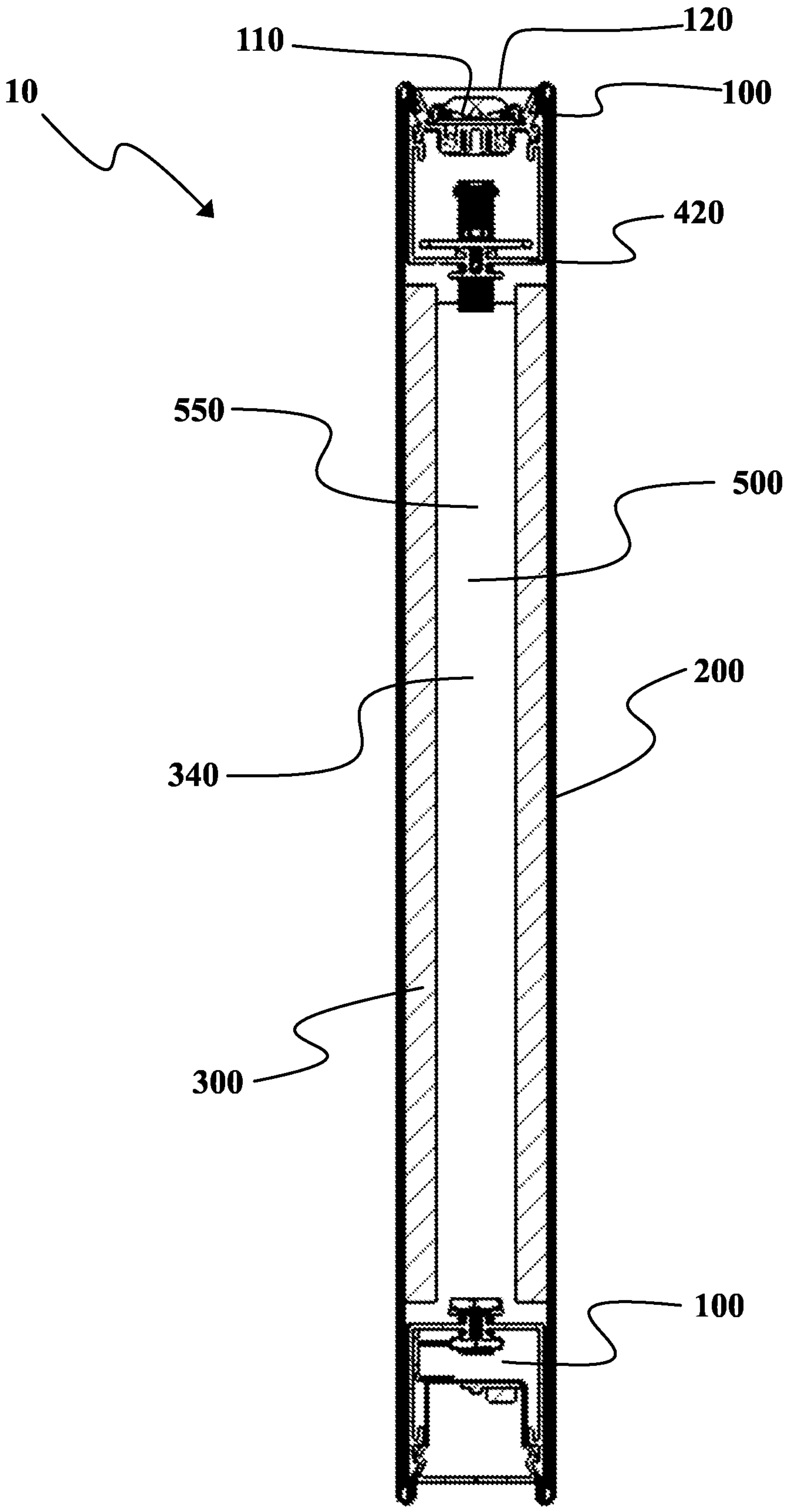
FIG. 3 is a side view of the sound absorbing light fixture of FIG. 1.
Figure 4:
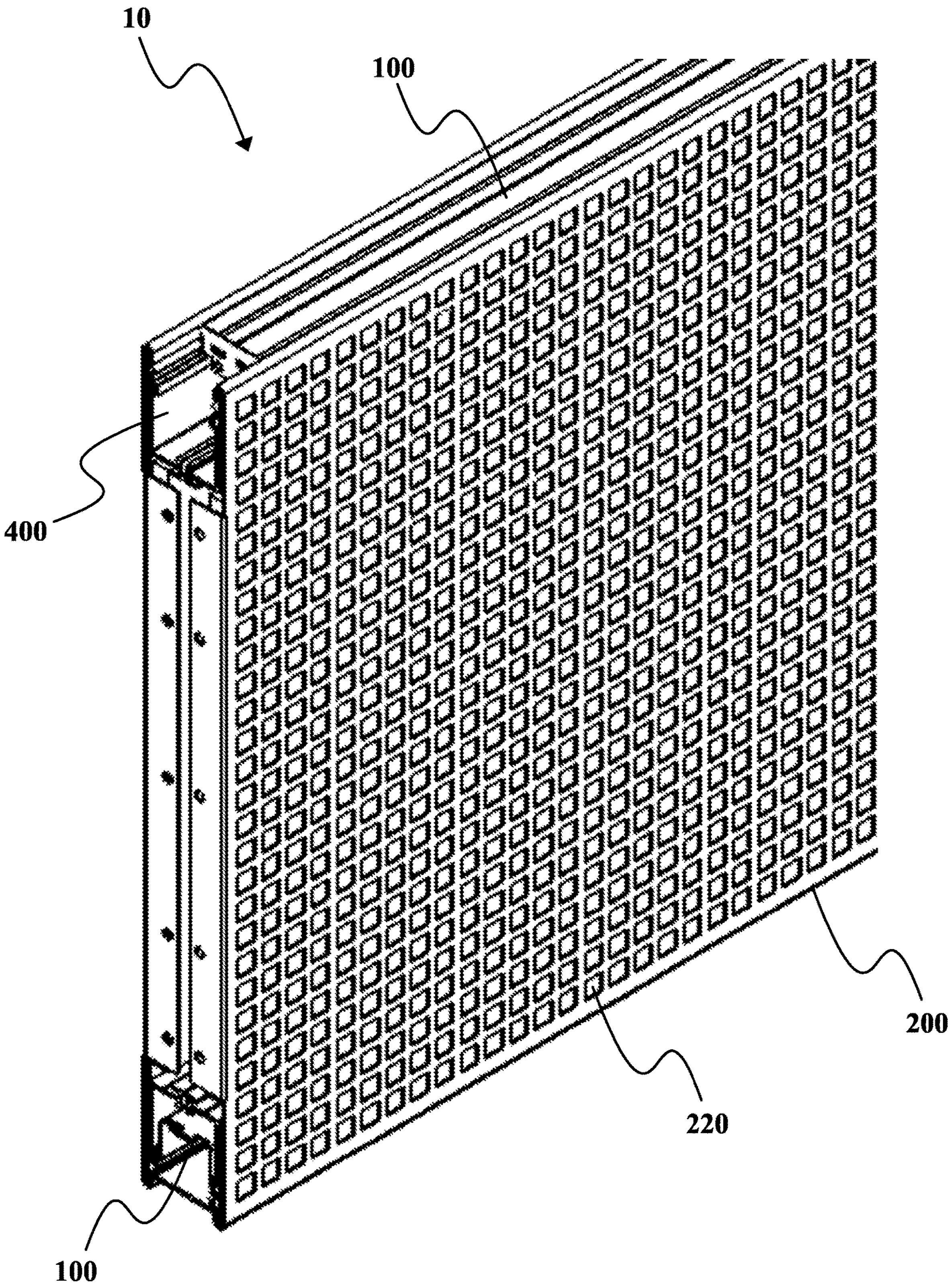
FIG. 4 is a front perspective view of an exemplary perforated panel used in relation to the sound absorbing light fixture of FIG. 1.
Figure 5:
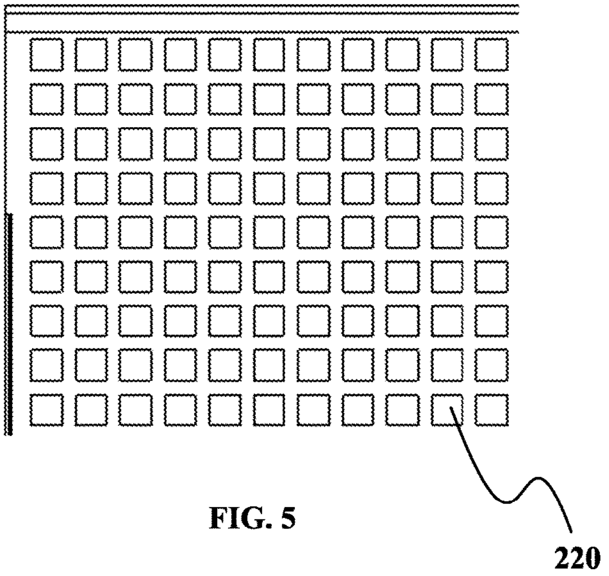
FIG. 5 is a front view of an exemplary perforated panel with square perforations used in relation to the sound absorbing light fixture of FIG. 1.
Figure 6:
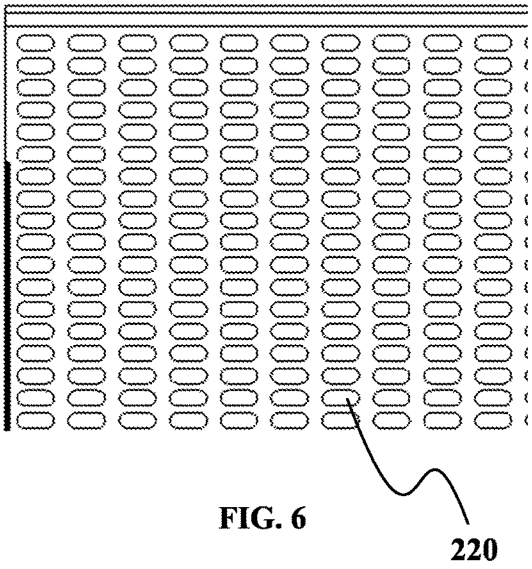
FIG. 6 is a front view of an exemplary perforated panel with oblong perforations used in relation to the sound absorbing light fixture of FIG. 1.
Figure 7:
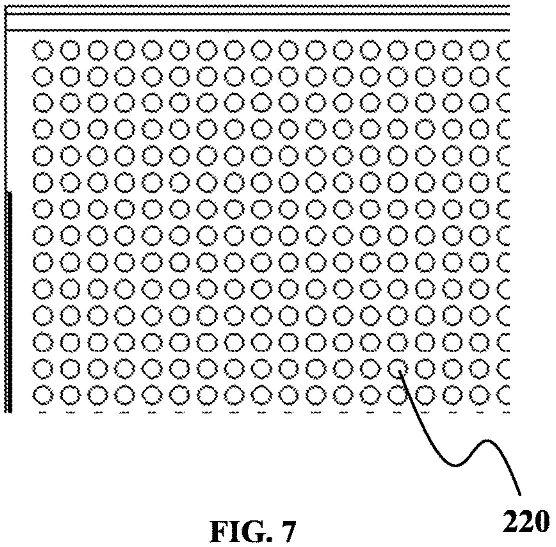
FIG. 7 is a front view of an exemplary perforated panel with circular perforations used in relation to the sound absorbing light fixture of FIG. 1.
Figure 8:
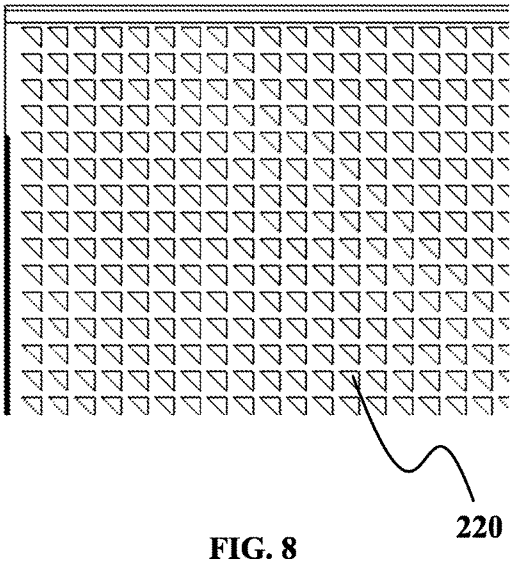
FIG. 8 is a front view of an exemplary perforated panel with triangular perforations used in relation to the sound absorbing light fixture of FIG. 1.

Referring now to FIG. 3, the sound absorbing light fixture 10 comprises two light emitting elements 100 with a first light emitting element 100 disposed near a top end 12 of the sound absorbing light fixture 10 and a second light emitting element 100 disposed near a lower end 14 of the sound absorbing light fixture 10. The light emitting elements 100 may comprise one or more one or more incandescent bulbs, light-emitting diodes, organic light-emitting diodes, laser diodes, any other suitable lighting means or any combinations thereof. In the present embodiment, a plurality of light-emitting diodes 110 are configured to generate sufficient light to illuminate a space around the sound absorbing light fixture 10. To that end, the light emitting elements 100 may comprise a plurality of light-emitting diodes 110 configured as light engines in series, in groupings, in clusters or any other suitable arrangement along the light emitting elements 100.

The light emitting elements 100 may additionally comprise a protective enclosure 120 configured to enclose the light-emitting diodes 110 within the sound absorbing light fixture 10. The enclosure 120 may be clear such as to permit an unobstructed emission of light. Alternatively, the enclosure 120 may be opaque such as to dissipate light emitted by the light emitting elements 100 or to hide the light-emitting diodes 110 as may be aesthetically desired. The enclosure 120 may comprise any suitable shape.

The light emitting elements 100 may comprise any suitable LED drivers suitable to provide the necessary electrical power required by the light-emitting diodes 110. The light emitting elements 100 may further comprise any suitable thermal management system to maintain a desired temperature of the light emitting elements 100 such as one or more heat sinks, cooling fins or any other suitable thermal management means.

In certain embodiments, the one or more light emitting elements 100 may be affixed to the frame 400 using one or more fasteners (not shown). The frame 400 may have any shape suitable for receiving one or more light emitting elements 100 while providing a desirable illumination of the surrounding space. The shape of the frame 400 may define the structure of the sound absorbing light fixture 10 and may be configured to meet the requirements defined by a designer, architect, customer or any other individual.

Referring to the embodiment illustrated in FIG. 2, the frame 400 is generally H-shaped with two rails 420 configured to receive the light emitting elements 100. In certain embodiments wherein the frame 400 comprises more than one rail 420, the rails 420 may be interconnected beams 440. The beams 440 may be straight, curved or have any other suitable or desirable shape.

Still referring to the embodiment illustrated in FIGS. 1 and 2, the sound absorbing light fixture 10 additionally comprises two perforated panels 200 with each perforated panel 200 configured to cover and/or conceal the sound absorbing panels 300 enclosed within the sound absorbing light fixture 10 as described in greater detail further below. The perforated panels 200 comprise a plurality of perforations 220 configured to allow sound waves to pass across the perforated panels 200. To that end, the perforated panels 200 may be made of a rigid or semi-rigid material such as aluminum, wood, fabric or any other desirable material with lesser concern for the sound reflecting properties of the selected material as the perforations 220 allow the ambient sound waves to reach the sound absorbing panels 300.

In certain embodiments (not shown), the perforated panels 200 may cover and/or conceal a portion or the entirety of the light emitting elements 100 with light generated by the light emitting elements 100 being emitted through the perforations 220.

The sound absorbing light fixture 10 may additionally comprise an internal cavity 500 defined as the internal volume of the sound absorbing light fixture 10 enclosed by the surrounding one or more perforated panels 200 and the frame 400. In certain embodiments where the one or more perforated panels 200 and frame 400 do not form a closed internal cavity 500, side panels 240 may additionally be installed to enclose said internal cavity 500.

The perforations 220 may be designed to leverage the Helmholtz resonance principle in order to effectively transform the sound absorbing light fixture 10 into a tuned resonant sound absorber.

Broadly speaking, the Helmholtz resonance principle defines a specific resonance frequency for a closed volume having one or more openings (or perforations). In the same vein, by using one or more perforated panels 200 in conjunction with a trapped or semi-trapped air cavity, an acoustical resonance condition may be achieved for a particular frequency range. More specifically, the Helmholtz defines the following relationship:

$$Fv = \frac{CD}{4}\sqrt{\frac{1}{\pi V(L+0.75D)}}$$

wherein Fv is the preferred resonant frequency of operation (Hz), V is the volume of a resonance chamber ($mm^3$) defined by cavity 500, D is the diameter of the perforation (mm) or, in embodiments comprising non-circular perforations, the diameter of a circle having a similar cross-sectional area, L is the depth of the perforation (mm) and C is the speed of sound (mm/s).

The present invention may incorporate perforations 220 having a diameter D and a depth L defined by the above-specified Helmholtz resonance principle. In an open-plan space, it is preferable to reduce mid-range frequencies (mid-tones of 500 Hz, 1000 Hz and 2000 Hz). Each of the perforations 220 may therefore comprise a diameter D and depth L targeting a dominant mid-range frequency. Although the perforations 220 may target a specific frequency, the perforations 220 may additionally provide sound transparency for incident sound waves to access the porous sound absorbing panels 300.

In a preferred embodiment, the surface area occupied by the perforations 220 may represent 30% to 60% of the total surface area of the one or more perforated panels 200 with each of the perforations 200 having a surface area between 0.75 and 175 $mm^2$.

The sound absorbing light fixture 10 may comprise one or more porous sound absorbing panels 300 disposed within the cavity 500. Still referring to FIG. 2, the porous sound absorbing panels 300 may be disposed between the perforated panels 200 and the rails 420 such as to be concealed when the sound absorbing light fixture 10 is assembled. Accordingly, the sound absorbing panels 300 may be affixed to the frame 400 or the perforated panels 200 using any suitable fastening means or press fitted within a spacing defined by the frame 400 or the perforated panels 200. The space within the cavity 500 which is not occupied by the one or more sound absorbing panels 300 defines a gap 550 allowing air to vibrate freely in accordance with the Helmholtz principle.

The porous sound absorbing panels 300 may comprise mineral wool, fiberglass, synthetic woven fibers, cork, PET felt, foam, Dura-Panel™, Texel™ or any other suitable sound absorbing material. The porous sound absorbing panels 300 may be flat, curved or may be configured to have any shape suitable to fit within the sound absorbing light fixture 10. To that end, sound wave energy captured within the sound absorbing light fixture 10 and generating air vibrations within the cavity 500 may be absorbed by the porous sound absorbing panels 300 and dissipated via viscous losses of the air molecules through the material. In a preferred embodiment, the gap 550 occupies a volume representing 25 to 50% of the volume of the cavity 500.

In certain embodiments, the aforementioned one or more perforated panels 200 and one or more sound absorbing panels 300 may be configured to be affixed to the frame 400. In a preferred embodiment, the one or more perforated panels 200 are disposed in a manner to predominantly or entirely conceal the sound absorbing panels 300 when the sound absorbing light fixture 10 is viewed fully assembled.

The present invention is not limited to perforations 220 having a circular cross-section. Referring now to FIGS. 5 to 8, other embodiments of the sound absorbing light fixture 10 are illustrated comprising perforations 220 having various cross-sectional shapes. Accordingly, the perforations 220 may comprise any other suitable cross-sectional shape such as, but not limited to, round, square, triangular, oval or rectangular shapes. In embodiments comprising larger perforations 220 allowing visibility therethrough, the sound absorbing light fixture 10 may additionally comprise a concealing layer 320 disposed between the perforated panels 200 and the sound absorbing panels 300 such as to further conceal the latter. The concealing layer 320 may comprise any material suitable to allowing sound waves to pass while offering a low acoustic impedance such as fabric.

Figure 9:
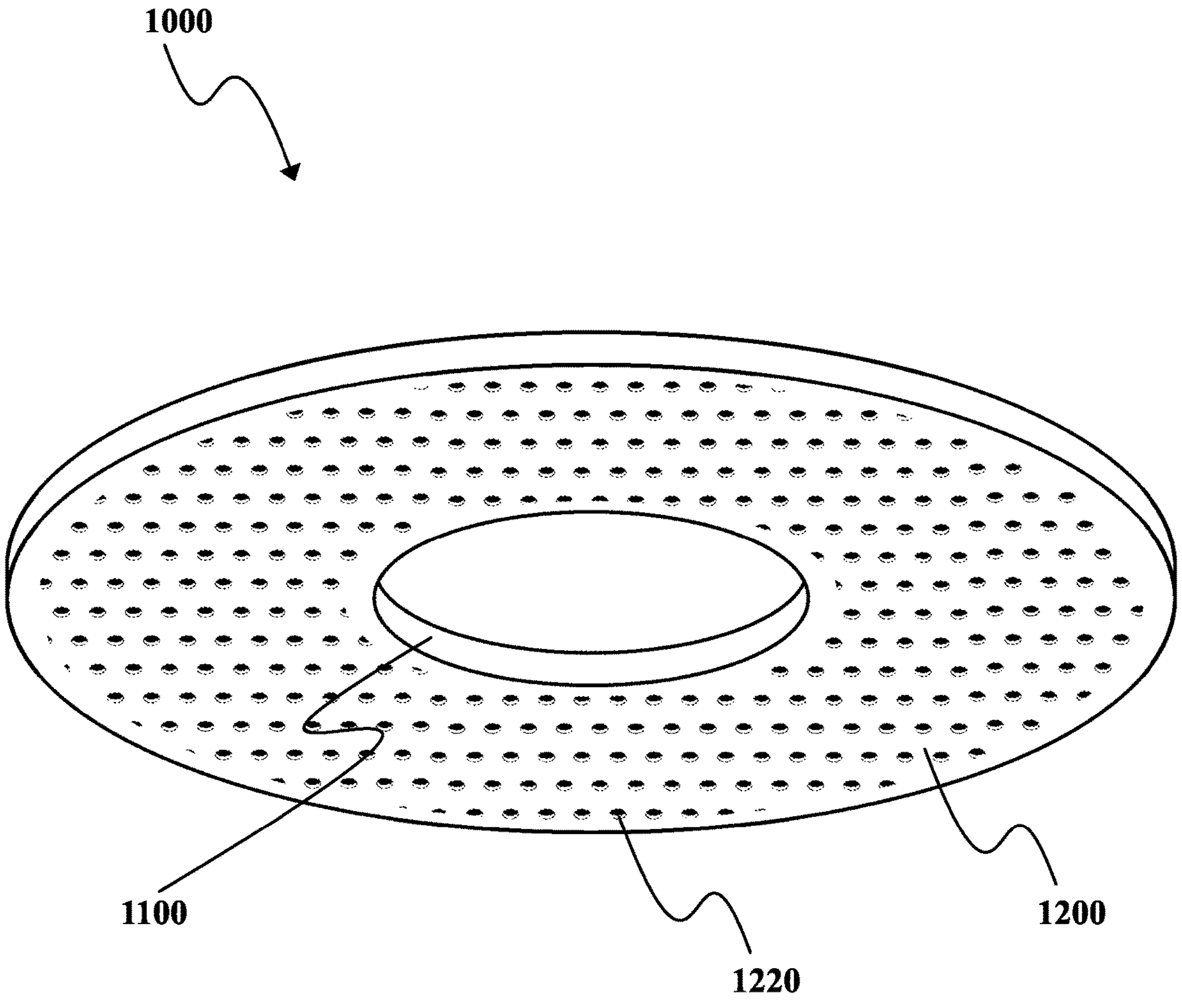
FIG. 9 is a bottom perspective view of another exemplary sound absorbing light fixture in accordance with the principles of the present invention.
Figure 10:
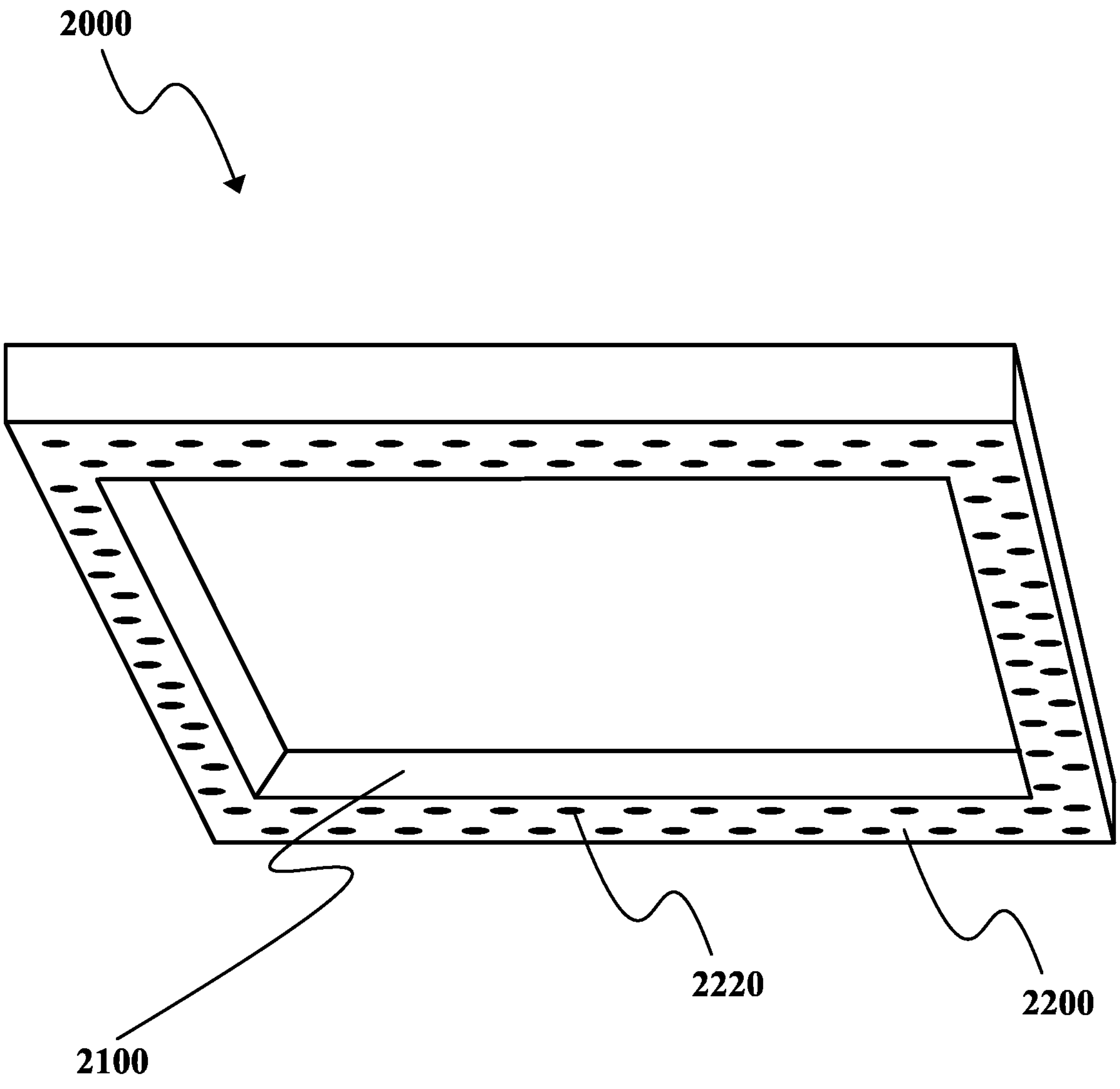
FIG. 10 is a bottom perspective view of yet another exemplary sound absorbing light fixture in accordance with the principles of the present invention.
Figure 11:
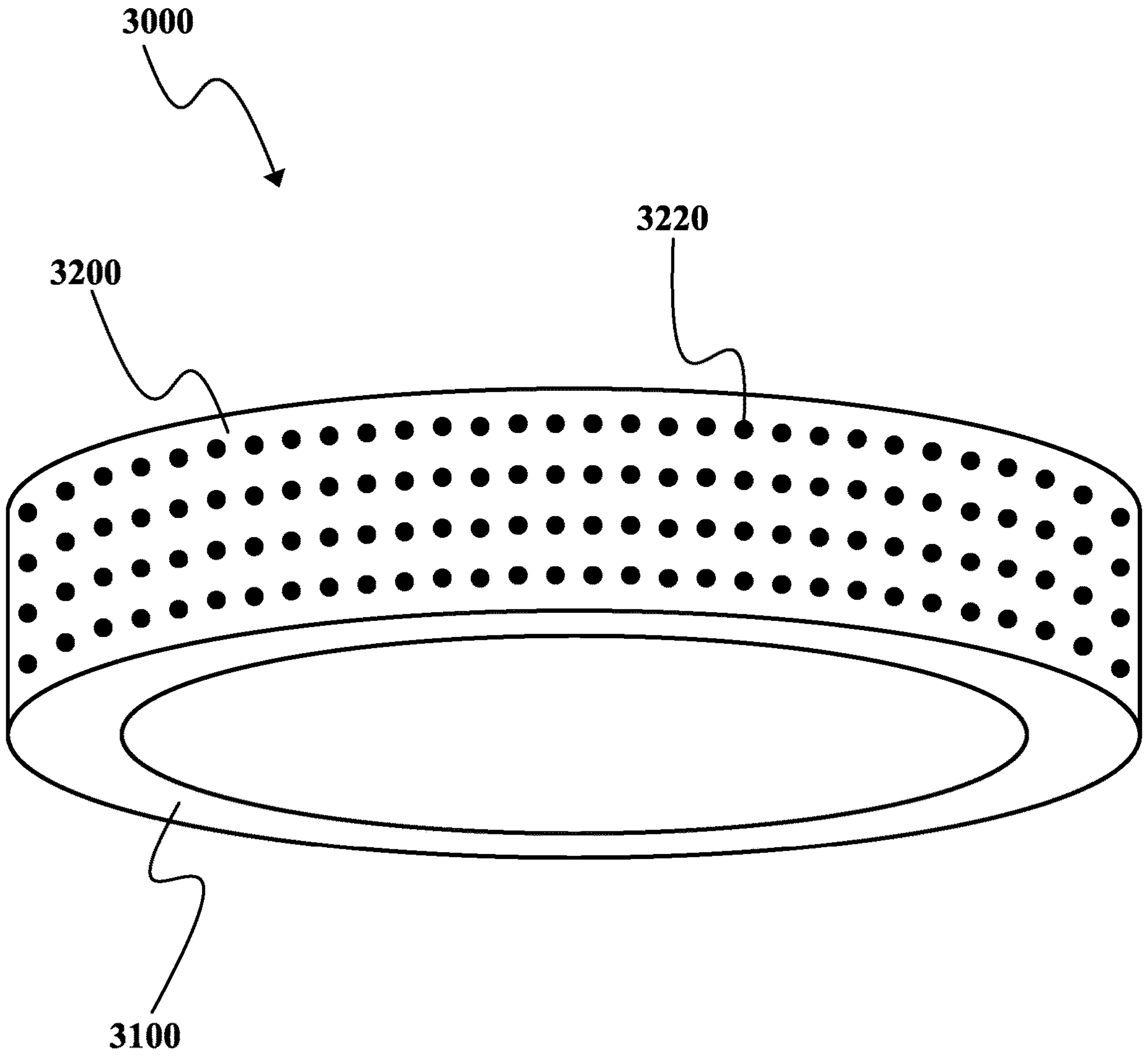
FIG. 11 is a bottom perspective view of yet another exemplary sound absorbing light fixture in accordance with the principles of the present invention.

While the present invention as heretofore presented the sound absorbing light fixture 10 as comprising a rectangular parallelepipedal shape, it may be appreciated that the sound absorbing light fixture 10 may comprise any other desirable shape respecting the principles detailed. In certain embodiments, the sound absorbing light fixture may comprise shapes similar to those illustrated in FIGS. 9 to 11. For example, FIG. 9 illustrates a circular sound absorbing light fixture 1000 with an open center comprising a light emitting element 1100 pointing inwardly and top and bottom perforated panels 1200 incorporating perforations 1220. FIG. 10 similarly illustrates a generally square sound absorbing light fixture 2000 with an open center comprising a light emitting element 1100 pointing inwardly and top and bottom perforated panels 2200 incorporating perforations 2220. Lastly, FIG. 11 illustrates a circular sound absorbing light fixture 3000 with an open center comprising a light emitting element 3100 pointing downwardly and a lateral perforated panel 3200 incorporating perforations 3220.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A sound absorbing light fixture comprising:

a frame at least partially delimiting a sound dampening cavity, a light emitting element extending along at least a first side of the frame, a sound absorbing core disposed within the sound dampening cavity and at least partially defining a sound dampening air gap within the sound absorbing light fixture, and at least one perforated panel affixed to at least one of the frame and the sound absorbing core, the at least one perforated panel comprising a plurality of resonance generating perforations and being configured to conceal at least a portion of the sound absorbing core, wherein a cross-sectional shape and a depth of the resonance generating perforations is selected such as to create an acoustical resonance condition within the sound dampening cavity.

2. The sound absorbing light fixture as claimed in claim 1, wherein the sound absorbing core comprises one or more sound absorbing panels made of sound absorbing material.

3. The sound absorbing light fixture as claimed in claim 2, wherein the sound absorbing material comprises synthetic woven fibers.

4. The sound absorbing light fixture as claimed in claim 1, wherein the sound dampening air gap represents approximately 25% to 50% of a total volume of the sound dampening cavity.

5. The sound absorbing light fixture as claimed in claim 1, wherein the cross-sectional shape and the depth of the resonance generating perforations is selected using the following equation:

$$Fv = \frac{CD}{4}\sqrt{\frac{1}{\pi V(L+0.75D)}}$$

wherein Fv is the preferred resonant frequency of operation, V is the volume of the sound dampening cavity, D is the diameter of one of the resonance generating perforations, L is the depth of one of the resonance generating perforations and C is the speed of sound.

6. The sound absorbing light fixture as claimed in claim 1, wherein a total surface area of the resonance generating perforations represents between 30% to 60% of a total surface area of the at least one perforated panel.

7. The sound absorbing light fixture as claimed in claim 1, wherein a shape of the resonance generating perforations is selected from one or more of: round, square, oval and rectangle.

8. The sound absorbing light fixture as claimed in claim 1, wherein a cross-sectional surface area of each of the resonance generating perforations is less than 176 $mm^2$.

9. The sound absorbing light fixture as claimed in claim 1, comprising a second light emitting element extending along a second side of the sound absorbing light fixture.

10. The sound absorbing light fixture as claimed in claim 1, wherein the light emitting element comprises light-emitting diodes.

11. The sound absorbing light fixture as claimed in claim 1, wherein the at least one perforated panel comprises a rigid or semi-rigid material.

12. The sound absorbing light fixture as claimed in claim 1, further comprising a concealing layer configured to conceal at least a portion of the sound absorbing core.

13. A method of mitigating ambient noise, the method comprising:

placing a sound absorbing core within a sound dampening cavity of a light fixture to define a sound dampening air gap;

at least partially concealing the sound absorbing core with at least one perforated panel, the at least one perforated panel comprising resonance generating perforations, and each of the resonance generating perforations comprising a cross-sectional shape and a depth being selected such as to create an acoustical resonance condition within the sound dampening cavity; and creating the acoustical resonance condition within the sound dampening cavity.

14. The method of claim 13 further comprising suspending the light fixture.

15. The method of claim 13 further comprising selecting a cross-sectional shape and a depth of the resonance generating perforations using the following equation:

$$Fv = \frac{CD}{4}\sqrt{\frac{1}{\pi V(L+0.75D)}}$$

wherein Fv is the preferred resonant frequency of operation, V is the volume of the sound dampening cavity, D is the diameter of one of the resonance generating perforations, L is the depth of one of the resonance generating perforations and C is the speed of sound.

16. The method of claim 13 further comprising at least partially concealing the sound absorbing core with a concealing layer.

17. The method of claim 13 further comprising the step of perforating the at least one perforated panel to create the resonance generating perforations over between 30% to 60% of a total surface area of the at least one perforated panel.

18. The method of claim 13 further comprising the step of perforating the at least one perforated panel to create the resonance generating perforations having a cross-sectional surface area of less than 176 $mm^2$.

19. The method of claim 13, wherein the sound absorbing core comprises synthetic woven fibers.

* * * * *